US012425186B2

(12) United States Patent
Vukolić et al.

(10) Patent No.: US 12,425,186 B2
(45) Date of Patent: Sep. 23, 2025

(54) REDUCING TRANSACTION ABORTS IN EXECUTE-ORDER-VALIDATE BLOCKCHAIN MODELS

(71) Applicant: International Business Machines Corporation, Armonk, NY (US)

(72) Inventors: Marko Vukolić, Zurich (CH); Angelo De Caro, Zurich (CH); Alessandro Sorniotti, Zurich (CH); Senthilnathan Natarajan, Bangalore (IN); Artem Barger, Haifa (IL); Yacov Manevich, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 17/210,925

(22) Filed: Mar. 24, 2021

(65) Prior Publication Data

US 2022/0311595 A1    Sep. 29, 2022

(51) Int. Cl.
*H04L 9/00* (2022.01)
*G06F 9/46* (2006.01)
*H04L 9/06* (2006.01)

(52) U.S. Cl.
CPC ........... *H04L 9/0618* (2013.01); *G06F 9/466* (2013.01); *H04L 9/50* (2022.05)

(58) Field of Classification Search
CPC .......... H04L 9/0618; H04L 9/50; G06F 9/466
See application file for complete search history.

(56) References Cited

U.S. PATENT DOCUMENTS

| 10,630,485 | B2 | 4/2020 | Zinder |
| 10,630,769 | B2 | 4/2020 | Carver |
| 10,860,259 | B1* | 12/2020 | Winarski .............. G06F 12/121 |
| 11,727,366 | B1* | 8/2023 | Cutler .................. G06Q 20/065 705/65 |
| 2017/0337534 | A1* | 11/2017 | Goeringer ............... H04L 63/12 |
| 2018/0323963 | A1* | 11/2018 | Stollman .............. H04L 9/3236 |
| 2019/0036778 | A1* | 1/2019 | Bathen ................ H04L 67/1076 |

(Continued)

FOREIGN PATENT DOCUMENTS

| CN | 111209093 A | 5/2020 |
| CN | 111752685 A | 10/2020 |

(Continued)

OTHER PUBLICATIONS

Xu et al. "Mitigating Conflicting Transactions in Hyperledger Fabric-Permissioned Blockchain for Delay-Sensitive IoT Applications", IEEE Internet of Things Journal, Jan. 8, 2021 (Year: 2021).*

(Continued)

*Primary Examiner* — David J Pearson
(74) *Attorney, Agent, or Firm* — Stephen R. Yoder

(57) ABSTRACT

A processor may store a write set of a transaction in a cache. The cache may include state information, and the cache may be uncommitted to a blockchain. The processor may identify a subsequent transaction. The subsequent transaction may read from the cache when a requested key is present in the cache. The processor may order the transaction and the subsequent transaction based on what is read from the cache. Ordering the transaction and the subsequent transaction may avoid an abort of the subsequent transaction.

6 Claims, 9 Drawing Sheets

(56) References Cited

U.S. PATENT DOCUMENTS

| | | | |
|---|---|---|---|
| 2019/0146946 A1* | 5/2019 | Zhang | G06F 16/113 707/667 |
| 2020/0026552 A1* | 1/2020 | Zhang | G06F 9/4843 |
| 2020/0074113 A1 | 3/2020 | Derosa-Grund | |
| 2020/0153605 A1* | 5/2020 | Hu | G06F 16/2379 |
| 2020/0167237 A1* | 5/2020 | Knuhtsen | H04L 9/3239 |
| 2021/0099311 A1* | 4/2021 | Saponaro | H04L 9/3297 |
| 2021/0203482 A1* | 7/2021 | Li | G06Q 20/02 |
| 2021/0326300 A1* | 10/2021 | Luo | G06F 16/148 |
| 2022/0311595 A1 | 9/2022 | Vukolic | |

FOREIGN PATENT DOCUMENTS

| | | | |
|---|---|---|---|
| CN | 112039987 A | | 5/2022 |
| WO | 2020087136 A1 | | 5/2020 |
| WO | WO2021139109 | * | 7/2021 |

OTHER PUBLICATIONS

Thakkar et al. "Performance Benchmarking and Optimizing Hyperledger Fabric Blockchain Platform", https://arxiv.org/pdf/1805.11390.pdf; May 29, 2018 (Year: 2018).*

Sharma et al. Blurring the Lines between Blockchains and Database Systems: the Case of Hyperledger Fabric SIGMOD '19, Jun. 30-Jul. 5, 2019, Amsterdam, Netherlands (Year: 2019).*

Jin et al. A High Performance Concurrency Protocol for Smart Contracts of Permissioned Blockchain IEEE Transactions on Knowledge and Data Engineering, vol. 34, No. 11, Nov. 2022 Date of First Publication: Feb. 17, 2021 (Year: 2021).*

Anonymous. "A system and method for using transaction height in blockchain for implementing Multi-version concurrency control." Published Feb. 14, 2018. 2 pages. Published by IP.com. https://priorart.ip.com/IPCOM/000252830.

Anonymous. "An apparatus to mitigate contention while providing serializable data isolation by leveraging transactional memory architecture." Published Mar. 20, 2019. 4 pages. Published by IP.com. https://priorart.ip.com/IPCOM/000257884.

Anonymous. "etcd API." Accessed Mar. 24, 2021. 16 pages. Published by ETCD. https://etcd.io/docs/v2/api/#atomic-compare-and-delete.

Anonymous. "etcd API." Accessed Dec. 22, 2020. 16 pages. Published by ETCD. https://etcd.io/docs/v2/api/#atomic-compare-and-swap.

Anonymous. "System and Method for executing Optimization Transactions in Distributed ledger technology based applications." Published Mar. 23, 2020. 4 pages. Published by IP.com. https://priorart.ip.com/IPCOM/000261633.

Meir, et al. "Increasing Concurrency in Hyperledger Fabric," SYSTOR '19, Jun. 3-5, 2019, Haifa, Israel, https://doi.org/10.1145/3319647.3325841, p. 179.

Cook, et al., "Read-Uncommitted Transactions for Smart Contract Performance." Published May 29, 2019. 11 pages. Publishd by ARXIV. https://arxiv.org/abs/1905.12351.

Khinchi, V., "Evaluating Various Transaction Processing Characteristics of Permissioned Blockchain Networks." Printed Oct. 30, 2018. 105 pages.

Mell, et al., "The NIST Definition of Cloud Computing," Recommendations of the National Institute of Standards and Technology, U.S. Department of Commerce, Special Publication 800-145, Sep. 2011, 7 pgs.

Nasirifard, et al., "FabricCRDT: A Conflict-Free Replicated Datatypes Approach to Permissioned Blockchains." Published Dec. 2019. 13 pages. In Proceedings of the 20th International Middleware Conference (Middleware '19). Association for Computing Machinery, New York, NY, USA, pp. 110-122. https://doi.org/10.1145/3361525.3361540.

Rao, et al., "Efficient Path Characteristics Orchestration for Blockchain Applications." Published Sep. 8, 2017. 7 pages. Published by IP.com. https://priorart.ip.com/IPCOM/000250842.

Ruan,, et al., "A Transactional Perspective on Execute-Order-Validate Blockchains." Published Mar. 23, 2020. 19 pages. Published by ARXIV. https://arxiv.org/abs/2003.10064.

Sharma, et al., "Blurring the Lines between Blockchains and Database Systems: the Case of Hyperledger Fabric." Published Jun. 2019. 18 pages. In Proceedings of the 2019 International Conference on Management of Data (SIGMOD 19). Association for Computing Machinery, New York, NY, USA, pp. 105-122. DOI:https://doi.org/10.1145/3299869.3319883.

Sorniotti, et al., "Fabric Proposal: Enhanced Concurrency Control." Accessed Dec. 22, 2020. 12 pages. https://docs.google.com/document/d/1Z3709nbpqBmukZQ88r2MmCr_DzTez--mCV5m3awhP-U/edit.

"Patent Cooperation Treaty International Search Report", International application No. PCT /IB2022/051984, International filing date: Mar. 7, 2022, Date of mailing of the international search report: Jun. 10, 2022, 6 pgs.

"Patents Act 1977: Examination Report under Section 18(3)", Application No. GB2314108.8, Nov. 21, 2023, 4 pages.

"Examination report No. 2 for standard patent application", IP Australia, Application No. 202245375, Date of this report Jun. 25, 2024, 3 pages.

Intellectual Property Office, "Request for the Submission of an Opinion," Jun. 17, 2025, 07 Pages, KR Application No. 10-2023-7029815.

* cited by examiner

REDUCING TRANSACTION ABORTS IN EXECUTE-ORDER-VALIDATE BLOCKCHAIN MODELS

BACKGROUND

The present disclosure relates generally to the field of transaction processing, and more specifically to reducing transaction aborts in execute-order-validate (EOV) blockchain transaction models.

Blockchain platforms, such as, the Hyperledger Fabric follow an EOV protocol/model. In this protocol, there are three phases. In the first phase, blockchain transactions are executed/simulated to collect read-write sets. In the second phase, the executed blockchain transactions are ordered. In the third and final phase, the blockchain transactions' read sets are validated to check for any serializability violation.

SUMMARY

Embodiments of the present disclosure include a method, system, and computer program for reducing transaction aborts in execute-order-validate blockchain models. A processor may store a write set of a transaction in a cache. The cache may include state information, and the cache may be uncommitted to a blockchain. The processor may identify a subsequent transaction. The subsequent transaction may read from the cache when a requested key is present in the cache. The processor may order the transaction and the subsequent transaction based on what is read from the cache. Ordering the transaction and the subsequent transaction may avoid an abort of the subsequent transaction.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
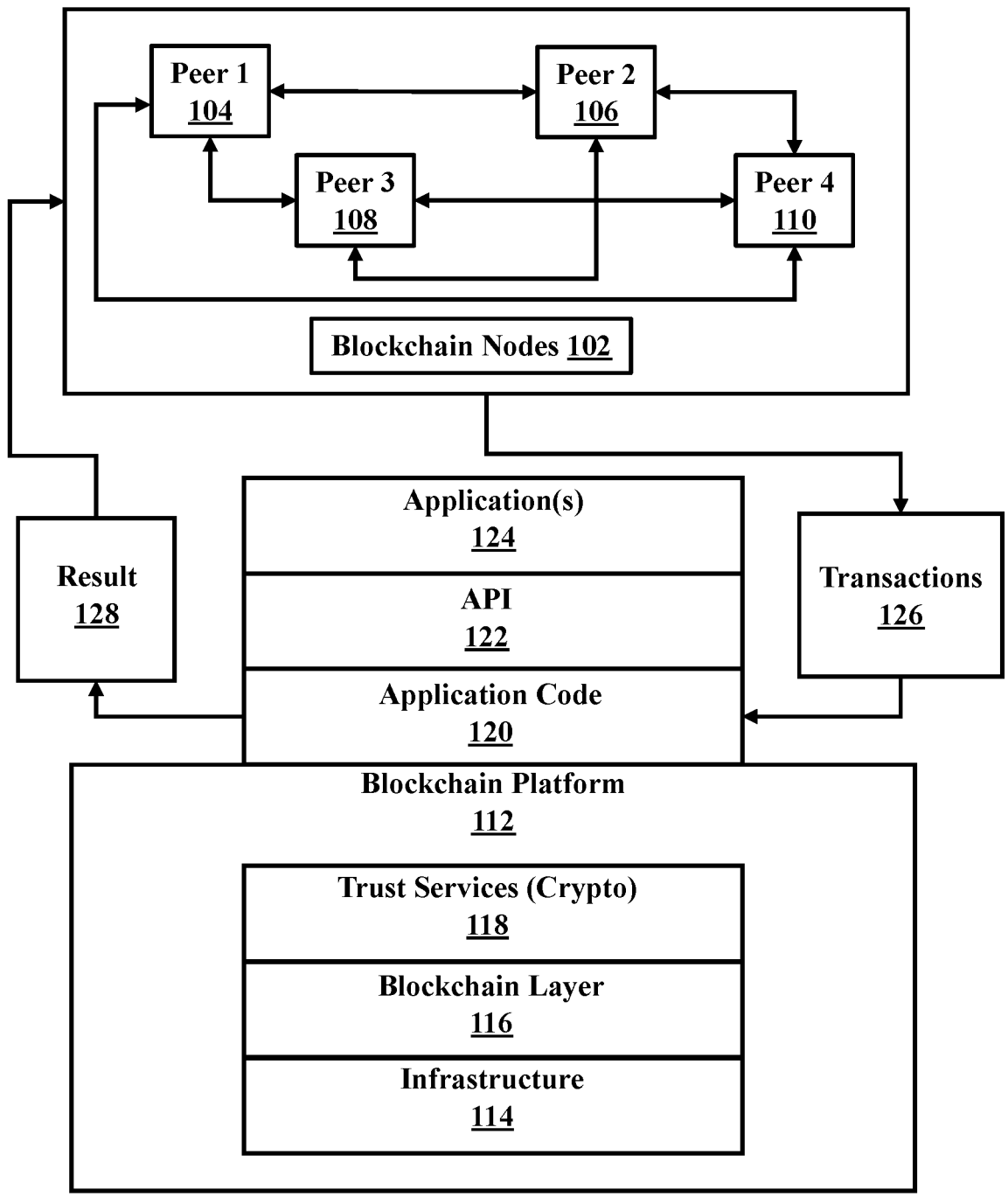
FIG. 1A illustrates an example blockchain architecture, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of transaction processing, and more specifically to reducing transaction aborts in EOV blockchain transaction models. Blockchain platforms, such as, the Hyperledger Fabric follow an EOV protocol/model. In this protocol, there are three phases. In the first phase, blockchain transactions are executed/simulated to collect read-write sets. In the second phase, the executed blockchain transactions are ordered. In the third and final phase, the blockchain transactions' read sets are validated to check for any serializability violation.

However, the common problem with the EOV protocol, is that, due to a time gap between the execution and validation phase, there is a high possibility of a serializability violation if multiple conflicting transactions are submitted in a short time-span. Thus, it reduces the goodput of the overall blockchain platform. For example, if two transactions are submitted to increase the balance of an account, only one transaction will get committed and another will get aborted due to serializable violation, e.g., the read version present in the read set would not match the currently committed version.

Thus, discussed herein in detail is a solution to avoid/alleviate serializability violations. As a general overview, the solution described will keep an uncommitted state cache at each node in a blockchain network and cache the write-set at the end of the execution phase. When a subsequent dependent transaction executes, it can read from the uncommitted state cache rather than reading from the currently committed version which would soon be modified by the previously executed transaction.

The benefit to such a disclosed solution is that because in an EOV model, the execution phase is already deterministic. Hence, it is not necessary to worry about determinism as needed in the post order execution. Thus, the disclosed solution can support arbitrary data rather than numbers/integers alone, which in turn will result in a higher goodput compared to the post-order execution (as there is no serial execution).

Before turning to the FIGS., it will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Additionally, while the terms transaction, transaction proposal, or proposal may be used throughout this description, it is noted that they may be interchangeable and are synonymous with a blockchain transaction/transaction proposal, which is not to be construed as a business or financial transaction. As a transaction proposal in regard to blockchain is a proposal to commit data to the blockchain and a transaction in regard to blockchain is said commitment of data or is an execution of a smart contract code that can be performed in response to conditions associated with the smart contract being satisfied.

Detailed herein are a method, system, and computer program product that reduces transaction aborts in EOV blockchain models.

In some embodiment, the method, system, and/or computer program product utilize a decentralized database (such as a blockchain) that is a distributed storage system, which includes multiple nodes that communicate with each other. The decentralized database may include an append-only immutable data structure resembling a distributed ledger capable of maintaining records between mutually untrusted parties. The untrusted parties are referred to herein as peers, node, and/or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public, or permission-less, blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal but which do not fully trust one another, such as businesses that exchange funds, goods, (private) information, and the like.

Further, in some embodiment, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode (such as managing a ordering/serialization of transactions to be committed to a blockchain network). In some embodiments, the method, system, and/or computer program product can further utilize smart contracts that are trusted distributed applications which leverage tamper-proof properties of the blockchain database and an underlying agreement between nodes, which is referred to as an endorsement or endorsement policy.

An endorsement policy allows chaincode to specify endorsers for a transaction in the form of a set of peer nodes that are necessary for endorsement. When a client sends the transaction to the peers (e.g., endorsers) specified in the endorsement policy, the transaction is executed to validate the transaction. After validation, the transactions enter an ordering phase in which a consensus protocol is used to produce an ordered sequence of endorsed transactions grouped into blocks.

In some embodiment, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node).

Another type of node is a peer node which can receive client submitted transactions, commit the transactions, and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing/confirming transactions and modifying a world state of the blockchain, which is another name for the initial blockchain transaction which normally includes control and setup information.

In some embodiment, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database that maintains a current state of the blockchain.

In some embodiment, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated) upon peer node startup, and before transactions are accepted.

Some benefits of the instant solutions described and depicted herein include a method, system, and computer program product for reducing transaction aborts in EOV blockchain models. The exemplary embodiments solve the issues of transactions that are to be committed at relatively the same time and which may involve a same endpoint (e.g., account, database where most up-to-date information is required, etc.).

It is noted that blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system described herein is implemented due to immutable accountability, security, privacy, permitted decentralization, availability of smart contracts, endorsements and accessibility that are inherent and unique to blockchain.

In particular, the blockchain ledger data is immutable, which provides for an efficient method for reducing transaction aborts in EOV blockchain models. Also, use of the encryption in the blockchain provides security and builds trust. The smart contract manages the state of the asset(s) to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set, and write-set. In other words, the blockchain inherent features provide for efficient implementation of reducing transaction aborts in EOV blockchain models and for ensuring the most up-to-date/correct information is committed to the blockchain, which in turn saves processing power and time related to processing the transaction and reduces strain on the blockchain network (e.g., the peers, nodes, components, etc.). As such, it is noted that the blockchain is not just a database; the blockchain comes with capabilities to create a network of users and to on-board/off-board organizations/entities/users to collaborate and execute service processes in the form of smart contracts, which may be associated with the serializing transactions, and which can reduce strain on the blockchain network itself.

The example embodiments provide numerous benefits over a traditional database. For example, through the blockchain, the embodiments provide for immutable accountability, security, privacy, permitted decentralization, availability of smart contracts, endorsements and accessibility that are exclusive, and unique, to the blockchain. Without such benefits provided by blockchain, there would be unnecessary processing time and computing power wasted on the processing/committing of transactions.

Meanwhile, a traditional database could not be used to implement the example embodiments because it does not bring all parties on the network, it does not create trusted collaboration and does not provide for an efficient serialization of transactions. The traditional database does not provide for tamper proof storage and does not provide for a means to avoid aborted transactions. Thus, the proposed embodiments described herein utilizing blockchain networks cannot be implemented by the traditional database, as without such benefits provided by blockchain, there would be, again, unnecessary processing time and computing power wasted on the processing of transaction.

Meanwhile, if a traditional database were to be used to implement the example embodiments, the example embodiments would have suffered from unnecessary drawbacks such as lack of security and slow data processing. Accordingly, the example embodiments provide for a specific solution to a problem in the arts/field of blockchain transaction processing.

Turning now to FIG. 1A, illustrated is a blockchain architecture 100, in accordance with embodiments of the present disclosure. In some embodiments, the blockchain architecture 100 may include certain blockchain elements, for example, a group of blockchain nodes 102. The blockchain nodes 102 may include one or more blockchain nodes, e.g., peers 104-110 (these four nodes are depicted by example only). These nodes participate in a number of activities, such as a blockchain transaction addition and validation process (consensus). One or more of the peers 104-110 may endorse and/or recommend transactions based on an endorsement policy and may provide an ordering service for all blockchain nodes 102 in the blockchain architecture 100. A blockchain node may initiate a blockchain authentication and seek to write to a blockchain immutable ledger stored in blockchain layer 116, a copy of which may also be stored on the underpinning physical infrastructure 114. The blockchain configuration may include one or more applications 124 which are linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 104-110.

The blockchain base or platform 112 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 116 may expose an interface that provides access to the virtual execution environment necessary to process the program code and engage the physical infrastructure 114. Cryptographic trust services 118 may be used to verify transactions such as encryption and key generation and to keep information private.

The blockchain architecture 100 of FIG. 1A may process and execute program/application code 120 via one or more interfaces exposed, and services provided, by blockchain platform 112. The application code 120 may control blockchain assets. For example, the application code 120 can store and transfer data, and may be executed by peers 104-110 in the form of a smart contract and associated chaincode with conditions or other code elements subject to its execution. As a non-limiting example, smart contracts may be generated to execute the transfer of assets/resources, the generation of assets/resources, etc. The smart contracts can themselves be used to identify rules associated with authorization (e.g., asset transfer rules, restrictions, encryption/key generation, etc.), access requirements (e.g., of a datastore, of an off-chain datastore, of who may participate in a transaction, etc.), and/or usage of the ledger. For example, the transactions 126 (e.g., to be serialized using cache of write-sets to avoid interruptions in committals) may be processed by one or more processing entities (e.g., virtual machines) included in the blockchain layer 116. The result 128 may include a plurality of linked shared documents (e.g., with each linked shared document recording how the transactions 126 are processed/to be processed). In some embodiments, the physical infrastructure 114 may be utilized to retrieve any of the data/information/assets/etc. described herein.

A smart contract may be created via a high-level application and programming language, and then written to a block in the blockchain. The smart contract may include executable code which is registered, stored, and/or replicated with a blockchain (e.g., a distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus committing transactions 126, or a transaction of the transactions 126, etc.).

Figure 1B:
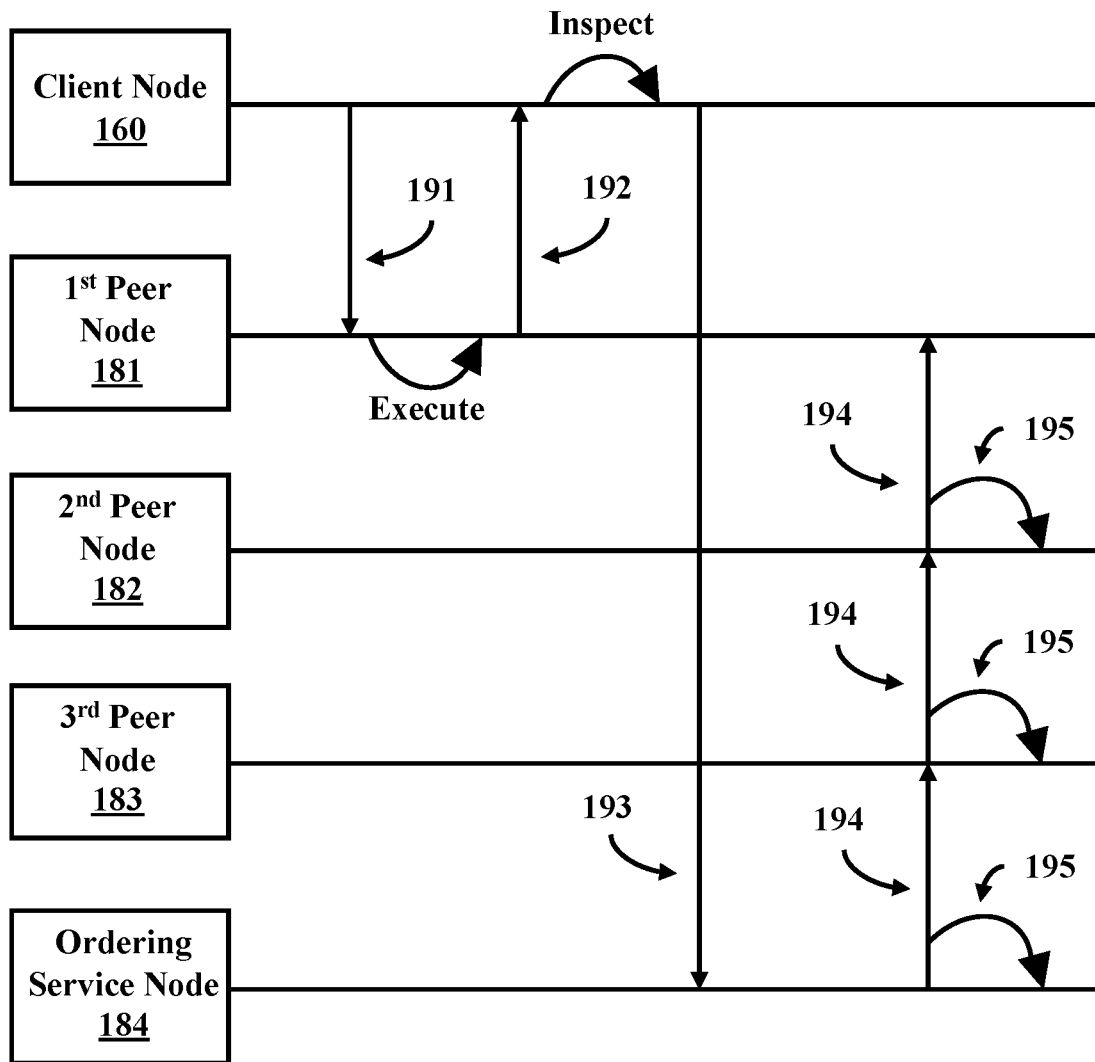
FIG. 1B illustrates a blockchain transactional flow, in accordance with embodiments of the present disclosure.

FIG. 1B illustrates an example of a blockchain transactional flow 150 between nodes of the blockchain in accordance with an example embodiment. Referring to FIG. 1B, the transaction flow may include a transaction proposal 191 sent by an application client node 160 to an endorsing peer node 181. The endorsing peer 181 may verify the client signature and execute a chaincode function to initiate the transaction. The output may include the chaincode results, a set of key/value versions that were read in the chaincode (read set), and the set of keys/values that were written in chaincode (write set). The proposal response 192 is sent back to the client 160 along with an endorsement signature, if approved. The client 160 assembles the endorsements into a transaction payload 193 and broadcasts it to an ordering service node 184. The ordering service node 184 then delivers ordered transactions as blocks to all peers 181-183 on a channel. Before committal to the blockchain, each peer 181-183 may validate the transaction. For example, the peers may check the endorsement policy to ensure that the correct allotment of the specified peers have signed the results and authenticated the signatures against the transaction payload 193.

Referring again to FIG. 1B, the client node 160 initiates the transaction 191 by constructing and sending a request to the peer node 181, which in this example is an endorser. The client 160 may include an application leveraging a supported software development kit (SDK), which utilizes an available API to generate a transaction proposal 191. The proposal is a request to invoke a chaincode function so that data can be read and/or written to the ledger. The SDK may reduce the package of the transaction proposal 191 into a properly architected format (e.g., protocol buffer over a remote procedure call (RPC)) and take the client's cryptographic credentials to produce a unique signature for the transaction proposal 191.

In response, the endorsing peer node 181 may verify (a) that the transaction proposal 191 is well formed, (b) the transaction has not been submitted already in the past (replay-attack protection), (c) the signature is valid, and (d) that the submitter (client 160, in the example) is properly authorized to perform the proposed operation on that channel. The endorsing peer node 181 may take the transaction proposal 191 inputs as arguments to the invoked chaincode function. The chaincode is then executed against a current state database to produce transaction results including a response value, read set, and write set. However, no updates are made to the ledger at this point. In some embodiments, the set of values, along with the endorsing peer node's 181 signature is passed back as a proposal response 192 to the SDK of the client 160 which parses the payload for the application to consume.

In response, the application of the client 160 inspects/verifies the endorsing peers signatures and compares the proposal responses to determine if the proposal response is the same. If the chaincode only queried the ledger, the application would inspect the query response and would typically not submit the transaction to the ordering node service 184. If the client application intends to submit the transaction to the ordering node service 184 to update the ledger, the application determines if the specified endorsement policy has been fulfilled before submitting. Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in the transaction payload step 193, the client 160 assembles endorsements into a transaction and broadcasts the transaction proposal 191 and response within a transaction message to the ordering node 184. The transaction may contain the read/write sets, the endorsing peers signatures and a channel ID (e.g., if a specific [off-chain] datastore is to be utilized, etc.). The ordering node 184 does not need to inspect the entire content of a transaction in order to perform its operation, instead the ordering node 184 may simply receive transactions from all channels in the network, order them chronologically by channel, and create blocks of transactions per channel.

The blocks of the transaction are delivered from the ordering node 184 to all peer nodes 181-183 on the channel. The transactions 194 within the block are validated to ensure any endorsement policy is fulfilled and to ensure that there have been no changes to ledger state for read set variables since the read set was generated by the transaction execution. Transactions in the block are tagged as being valid or invalid. Furthermore, in steps 195 each peer node 181-183 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 2A:
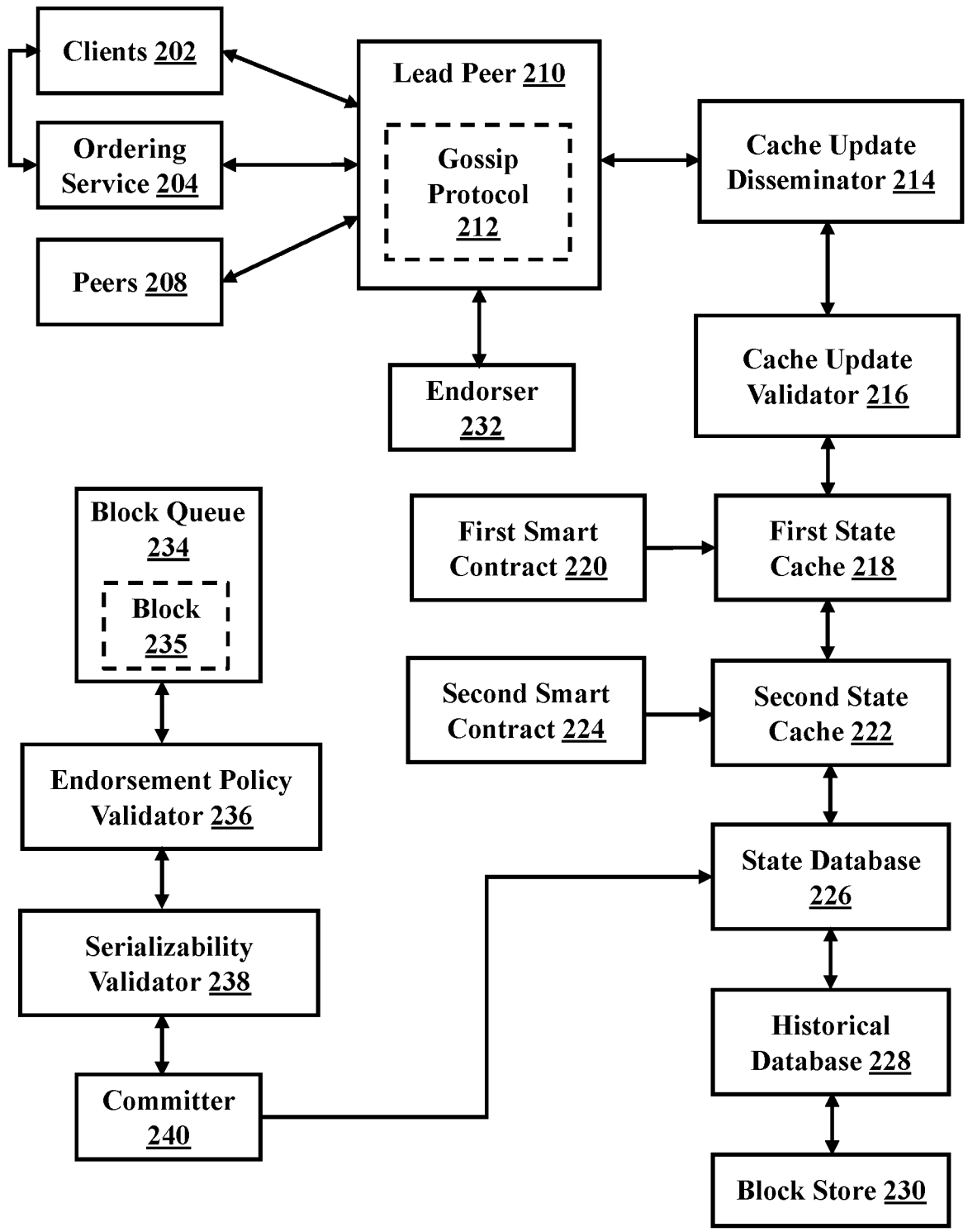
FIG. 2A illustrates an example of a distributed system for reducing transaction aborts in execute-order-validate blockchain models, in accordance with embodiments of the present disclosure.

Referring now to FIG. 2A, illustrated is an example of a distributed system 200 for reducing transaction aborts in execute-order-validate blockchain models, in accordance with embodiments of the present disclosure. As depicted, the distributed system 200 includes clients 202, an ordering service 204, peers 208, a lead peer 210 that includes a gossip protocol 212, a cache update disseminator 214, a cache update validator 216, a first state cache 218, a first smart contract 220, a second state cache 222, a second smart contract 224, a state database 226, a historical database 228, a block store 230, an endorser 232, a block queue 234, an endorsement policy validator 236, and a committer 240.

In some embodiments, the lead peer 210 communicates, and receives, gossip/information via the gossip protocol 212. The lead peer may communicate with the clients 202, the ordering service 204, the peers 208, the endorser 232, the cache update disseminator 214, and any of the other listed. In some embodiments, the communication with the listed components may be via a remote procedure call (e.g., gRPC).

In some embodiments, the distributed system 200 depicts the peer process used when one or more transactions are sent to the distributed system 200 to be added to a blockchain (e.g., the block store 230). As described herein, the lead peer 210 first communicates with the cache update disseminator 214, which sends cache updates to other endorsers (or the endorser 232) of either the first smart-contract 220 or the second smart contract 224. The cache updates, as will be discussed more fully below, can be identified from, or be, a write-set of the one or more transactions, which allows for a reduction of aborts as they relate to multiple transactions. In some embodiments, the cached update validator 216 communicates through the distributed system 200 and collects cache updates from the peers 208 and validates whether all endorsers (e.g., including the endorser 232) have given a matching update/matching updates.

In some embodiments, the cache update validator 216 and the cache update disseminator 214 receive their cache updates from either, or both, the first state cache 218 and/or the second state cache 222. In either instance, both the first state cache 218 and the second state cache 222 are controlled by their respective smart contracts 220, 224; and are located on any of the peers 208 that are authorized by the smart contracts 220, 224. The first state cache 218 and the second state cache 222 may additionally be respectively associated with a first and second transaction (not shown) and be an uncommitted cache of information related to a write-set of the first and second transactions.

In some embodiments, the one or more transactions are submitted by/through the lead peer 210 to the ordering service 204 in a serial/sequential order that has been defined by the lead peer 210 and/or confirmed by the endorser 232 to avoid any aborts of the transactions. In some embodiments, to avoid reordering at the ordering service 204, the lead peer 210 can batch all transactions in a single transaction.

In some embodiments, the peer process proceeds in a normal operation. For instance, the endorser 232 simulates transactions that are directly submitted by a user to the lead peer 210 (or the peers 208). In some embodiments, the block 235 of the block queue 232 is then processed by the remaining components of the distributed system 200 as depicted. In some embodiments, the endorser 232 provides the transactions that are deterministic to the block queue 234. Regardless of embodiment, the endorsement policy validator 236 then validates that the correct endorser 232 was used and/or that the correct endorsement protocol/procedure was used. The serializability validator 238 then checks whether any of the read versions have been changed in the committed state. If there is no change, the transaction is marked valid. Otherwise, the transaction is marked invalid. That is, the transactions are ordered based on what is identified in the first state cache 218 and the second state cache 222, such that if one transaction uses the information from another, that transaction is not aborted if the other transaction was received by the distributed system 200 first.

In some embodiments, the committer 240 updates the blockchain states (e.g., 226, 228, and 230) and also removes entries from the cache 218, 222. The entries removed from the cache 218, 222 are the ones present in the committed transaction's write-set. In some embodiments, the state database 226 is saved in the historical database 228 and then subsequentially stored in the block store 230. It is noted that the novel components presented in this disclosure and depicted in FIG. 2A are the cache update disseminator 214, the cache update validator 216, and the state caches 218, 222. Further, the gossip protocol 221 and the serializability validator 238 are novelly modified. With such novel components and modifications, there are no changes to the existing version management in Fabric.

It is further noted that although depicted in a flow, the information dissemination in the distributed system 200 may be performed in any manner, e.g., information of the one or more transactions can be first analyzed and their information sent to the either of the caches 218, 224 before the cache update disseminator 214 and/or the cache update validator 216 are communicated/interacted with.

Figure 2B:
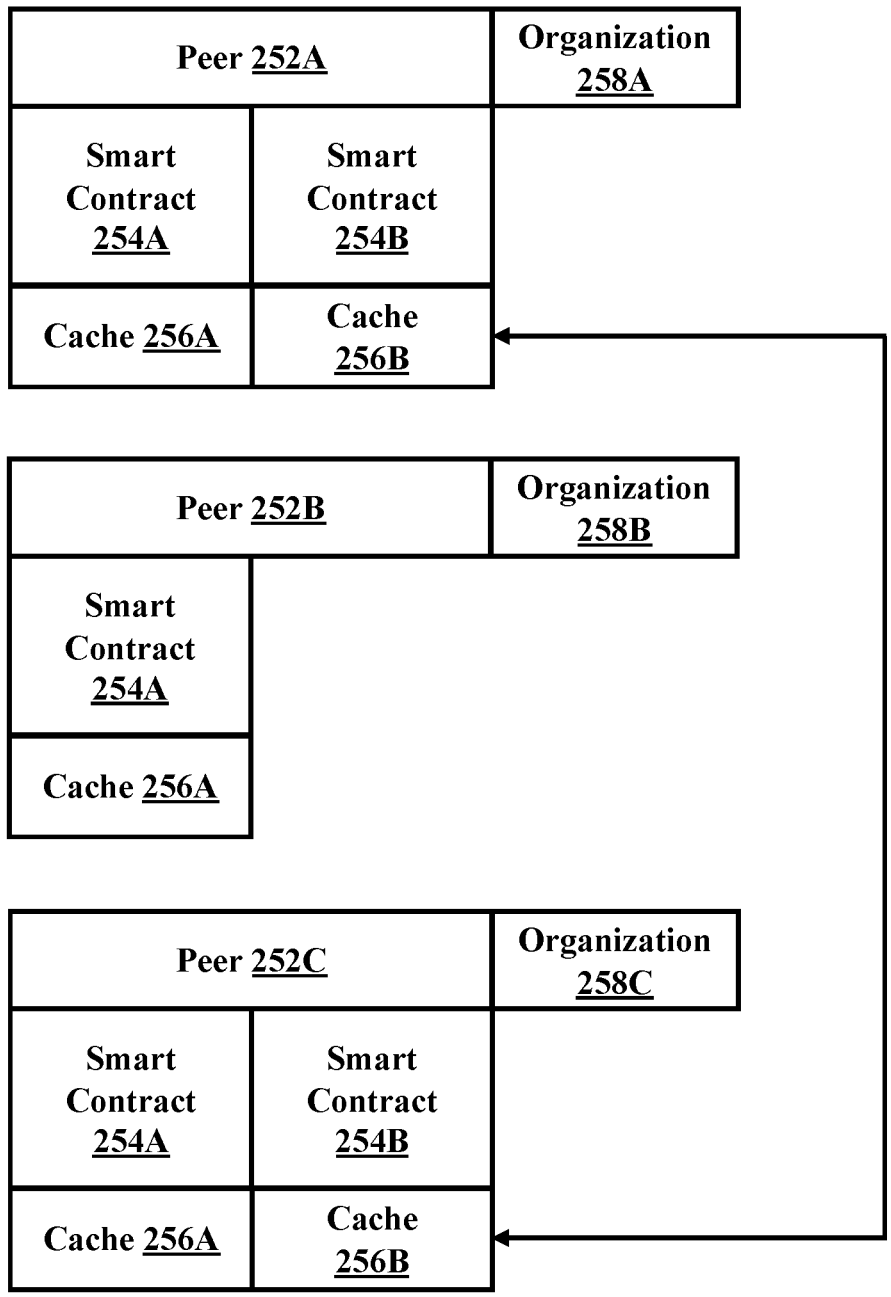
FIG. 2B illustrates an example of a Hyperledger Fabric system for reducing transaction aborts, in accordance with embodiments of the present disclosure.

Turning now to FIG. 2B, illustrated is an example of a Hyperledger Fabric system 250 for reducing transaction aborts, in accordance with embodiments of the present disclosure. As depicted, a peer 252A is controlled by an organization 258A, and smart contracts 254A, 254B dictate which transactions are handled by peer 252A. In such an embodiment, each smart contract 254A, 254B respectively control which cache 256A or 256B a write-set/information of a transaction is held before commitment to a blockchain. Additionally depicted is a peer 252B controlled by an organization 258B; and a peer 252C controlled by an organization 258C. Each of the other peers 252B and 252C may be controlled by the same smart contracts 254A, 254B. It is noted that like reference numerals are used to designate like parts in the accompanying drawings.

In some embodiments, the smart contract 254A has an "AND(orgA, orgB, orgC)" endorsement policy, and the smart contract 254B has an "AND(orgA, orgC) endorsement policy." In such an embodiment, the endorsement policy dictates all peers 252A-C that host the smart-contract(s) 254A and/or 254B to execute a request and there is accordingly no need to disseminate the (uncommitted state) cache 256A, 256B updates, i.e., a write-set of the simulated request.

In some embodiments, the Hyperledger Fabric system 250 may receive a first transaction proposal and a second transaction proposal at the same, or substantially the same time, and each proposal may be associated with smart contract 254B. As depicted the proposal may not go to all peers 252A-C as the smart contract 254B only includes peers 252A and 252C. Traditionally, peer 252A needs to disseminate a write-set after simulating the proposal to other endorsers of smart-contract 256B, e.g., peer 252C, and as per the endorsement policy, if peer 252A sends the signed write-set to peer 252C, it would trust the received write-set (because the signature satisfies the endorsement policy).

However, in the embodiments disclosed herein, the first transaction proposal and the second transaction proposal modify the same keys or there may be inconsistencies in keys/values. In such an instance, there is a dissemination of cache updates (e.g., such as by the cache update disseminator 214 of FIG. 2A), and if the first transaction proposal and the second transaction proposal modify the same keys, the uncommitted state cache 256A (because the transactions each relate to smart contract 254A) at peers 252A and 252B would differ. The cache 256A at peer 252A would have peer 252B's update and the cached 256A at peer 252B would have peer 252A's update. Noted though, is because of the novel use of state cache at each peer 252A, 252B, there would be no effect on the serializable isolation property as optimistic concurrency control (OCC) validation against the committed states only is always performed. It would only result in transaction invalidation (not an abort of the transaction). The cache divergence would be temporary, and it will synchronize once a client stops submitting conflicting transactions simultaneously.

In some embodiments, for efficiency, the conflicting transaction(s) must be submitted one after the other by the client. Proposed is a leader peer (e.g., lead peer 210 of FIG. 2A) per smart-contract 254A, 254B (e.g., 220/224 of FIG. 2A) to issue sequence numbers of each cache update for that smart-contract 254A or 254B. Using this sequence, the Hyperledger Fabric system 250 is able to order the updates and always keep the cache 256A/256B consistent at all peers 252A-C (or 208 of FIG. 2A). In some embodiments, a consensus is run between the endorsers (e.g., peers 252A-C) of the smart-contracts 254A-B to order the cache updates.

In some embodiments, before ordering, an endorsement policy identifies a set of Fabric peers (e.g., 252A-C) whose signatures are necessary, and sufficient, to approve any change to a given chaincode namespace. In this sense, the set of peers 252A-C (or any combination thereof) form a logical entity that are collectively referred to as a custodian or guardian. In addition, if a private data collection is in place among these peers 252A-C (or any combination thereof), they are also the only nodes in the network knowing the state values in the namespace they guard.

In this embodiment, the custodian is in charge of the coordination of all the transactions targeting the namespace the custodian is guarding. In particular, the custodian will collect the transactions, analyze a dependency graph and reorder the transactions/proposals as necessary, and submit the transactions to the ordering service. In some embodiments, in order to avoid reordering at the ordering service, the custodian can batch all transactions in a single transaction. It is noted that in this embodiment, the committing phase is not affected, therefore, it can go at full speed. Further noted is, this embodiment requires coordination among the Fabric peers 252A-C (or any combination thereof) forming the custodian, and requires the election of a leader in charge of submitting the transactions to the ordering service.

As an example, consider a traditional banking use-case where a bank customer wants to make two (or more) different money transfers (using some automation software). If each transaction is submitted in parallel, only one transaction would get through. The automation software needs to serially submit each transaction after verifying that the previous transaction is committed, and this significantly reduces the overall throughput. The proposed solution described herein would alleviate the need for the serial verification by placing write-sets of the transactions into cache so they cannot change information that may be used by a prior transaction that was only received or ordered after a subsequent transaction.

Furthering the example, assume the first transaction received by the banking system is actually transaction two (T2), and T2 has a read-set [k1, 1], where the read-set contains keys and read versions; and a write-set [k1, v3], where the write-set contains keys and new values. Further, the banking system has a state database with [k1, v1, 1]. The proposed solution would do a simulation of T2 and during said simulation store the write-set [k1, v3] and an indicator associated with T2 in an uncommitted state cache (e.g., [k1, v3 T2]) during the end of an execution phase of T2.

Continuing, a subsequent transaction T1 (which is actually the first transaction), having a read-set [k1, T2] and a write-set of [k1, v2] may be simulated after T2's execution phase; and during the execution phase of T1, T1 would read from the uncommitted state cache before execution because a requested key (k1) is present in T1. In some embodiments, after the execution phase of T1, the uncommitted state cache is now [k1, v2 T1] (e.g., the write set of T1 with an indicator.

Then, during an ordering phase, it would be identified that T2 needs to be processed before T1 as the read-set of T1 includes T2. Thus, an edge from transaction T2 to T1 would be added because transaction T1 has a version T2 in its read-set and would then be ordered to be processed after T1. To perform the transactions ordering, we can execute a topological sorting algorithm on the dependency graph. Accordingly, during a validation phase, transaction T2 will be committed before T1 and an abort of either T1 or T2 is avoided because T1 reads the version written by T2 and not a stale state. In some embodiments, after the validations of T1 and/or T2 the state database is updated to reflect the correct commitment of the transactions T1 and/or T2, e.g., the state database transitions from [k1, v1, 1] to [k1, v3, 2] (e.g., the correct key with the correct version from T2). At the same time, the entries associated with these transactions present in the uncommitted cache are also removed because they are available now in the state database itself.

Again highlighting the differences between the novel approach presented above versus a traditional EOV. Only during validating of T1 would a validator notice that T2 is the read version T1 that has the read-set [k1, T2]. Thus, if T2 is not yet committed, T1 would be abort; or if T2 is aborted, T1 would be aborted; or if T2 is committed and if the following condition satisfies, T1 would be committed, otherwise, T1 would be aborted. That is, only if a current committed version of k1 in a database is the same as the committed key by T2 and the committed version of k1 is the same per the read-set would T1 be committed too.

Figure 2C:
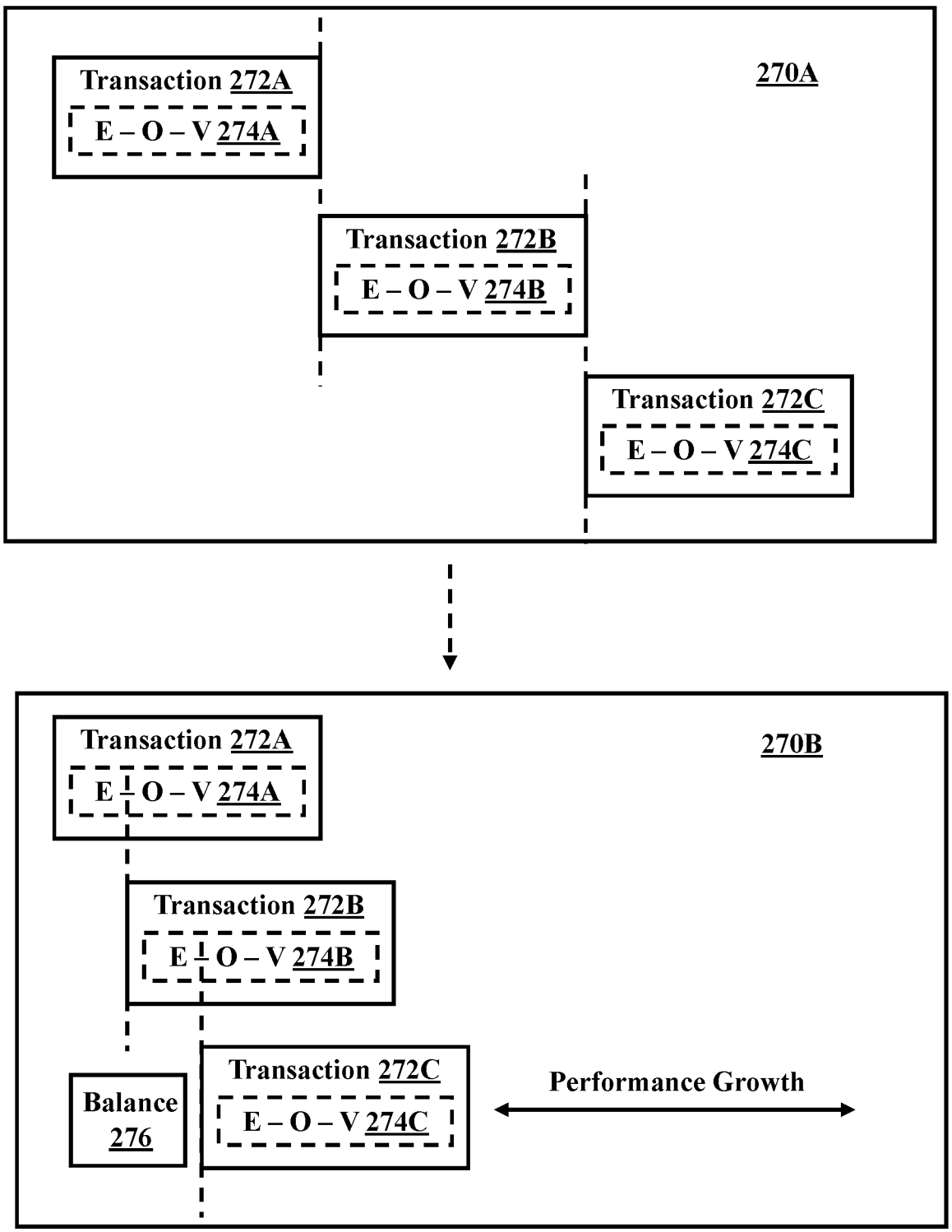
FIG. 2C illustrates an example of an improved execute-order-validate approach, in accordance with embodiments of the present disclosure.

Referring now to FIG. 2C, illustrated is an example of an improved execute-order-validate (EOV) approach 270B, in accordance with embodiments of the present disclosure. As depicted, a naïve EOV approach 270A has transaction 272A processed only after E-O-V 274A is completed, then subsequently transaction 272B is processed only after E-O-V 274B is completed, and finally transaction 272C is processed only after E-O-V 274B is completed. Thus, with the naïve EOV approach 270A, there is a significant increase on the overall throughput for processing transactions 272A-C and in kind an significant increase in computing power and strain put on the system (e.g., 200, 250, etc.) processing the transactions 272A-C.

This is opposed to the improved (EOV) approach 270B, which at the end of every execution phase in E-O-V 274A-C caches a write-set and can provide a transaction balance (balancing) 276, that identifies if a transaction is deterministic and should the processed before any of the other transactions 272A-C. In such an embodiment, the disclosed improved (EOV) approach 270B substantially improves the performance growth/decreased the overall throughput for processing transactions 272A-C.

Figure 3:
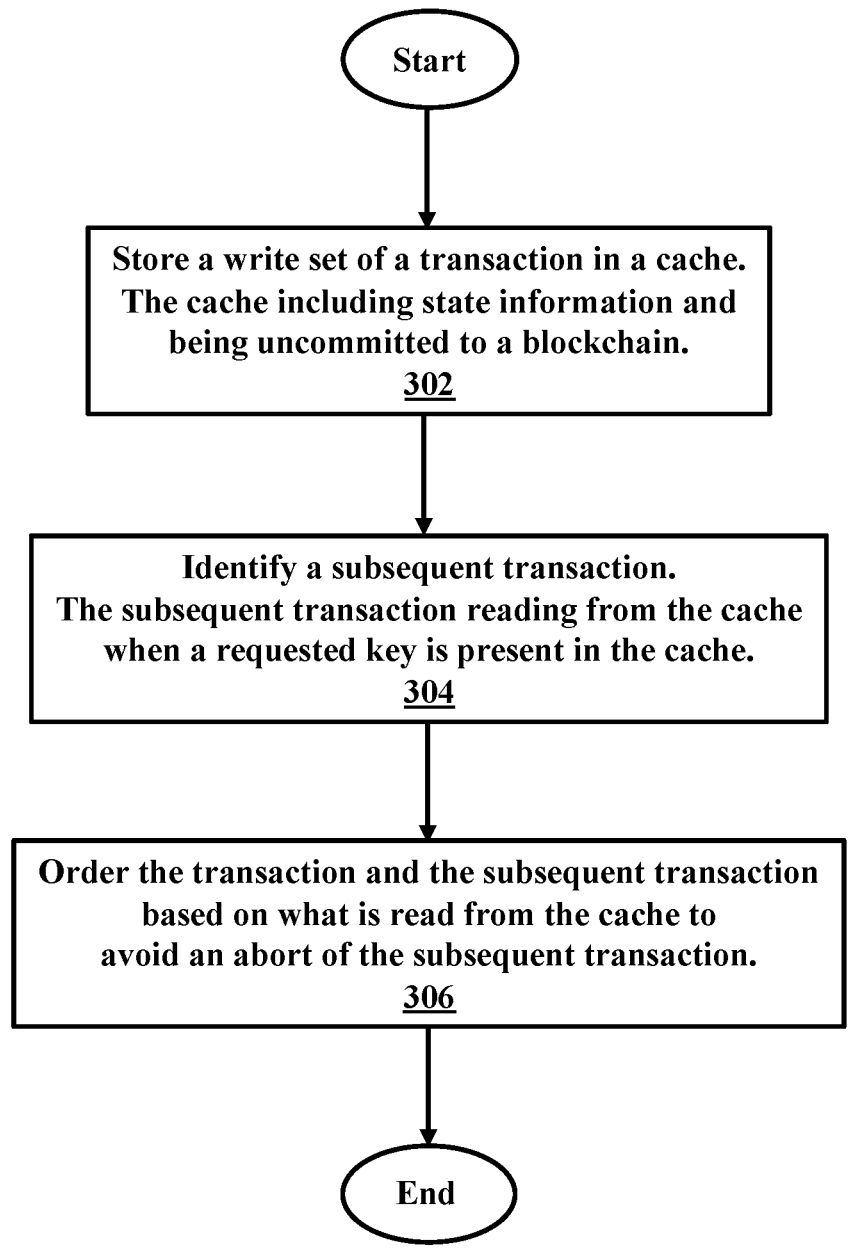
FIG. 3 illustrates a flowchart of an example method for reducing transaction aborts in execute-order-validate blockchain models, in accordance with embodiments of the present disclosure.

Referring now to FIG. 3, illustrated is a flowchart of an example method 300 for reducing transaction aborts in execute-order-validate blockchain models, in accordance with embodiments of the present disclosure. In some embodiments, the method 300 may be performed by a processor, node, and/or peer node in a blockchain network/system (such as the distributed system 200 of FIG. 2A and/or the Hyperledger Fabric system 250 of FIG. 2B). In some embodiments, the method 300 begins at operation 302, where the processor stores a write set of a transaction in a cache. The cache may include state information, and the cache may be uncommitted to a blockchain.

In some embodiments, the method 300 proceeds to operation 304, where the processor identifies a subsequent transaction (which may actually be a first transaction that is received after a technical second transaction). In some embodiments, the subsequent transaction may read from the cache when a requested key is present in the cache.

In some embodiments the method 300 proceeds to operation 306, where the processor orders the transaction and the subsequent transaction based on what is read from the cache. Ordering the transaction and the subsequent transaction may avoid an abort of the subsequent transaction. In some embodiments, the method 300 may end.

In some embodiments, discussed below, there are one or more operations of the method 300 not depicted for the sake of brevity. Accordingly, in some embodiments, storing the write set in the cache may allow the read set to include both a version number used in the storage of state as well as an identification associated with the transaction. In some embodiments, the identification denotes a state (e.g., key, value, version number, iteration, etc.) that is in the uncommitted cache.

In some embodiments, ordering the transaction and the subsequent transaction may include validating the subsequent transaction. In some embodiments, validating the subsequent transaction may comprise the processor identifying a first version number used in the storage of state as associated with the transaction. The processor may identify a second version number used in the storage of state as associated with the subsequent transaction, and the processor may determine which of the first version number or the second version number is a dependent version number.

In some embodiments, the processor may identify that the first version number depends from the second version number. The processor may commit the subsequent transaction before the transaction. In some embodiments, the processor may identify that the second version number depends from the first version number. The processor may commit the transaction before the subsequent transaction.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4A:
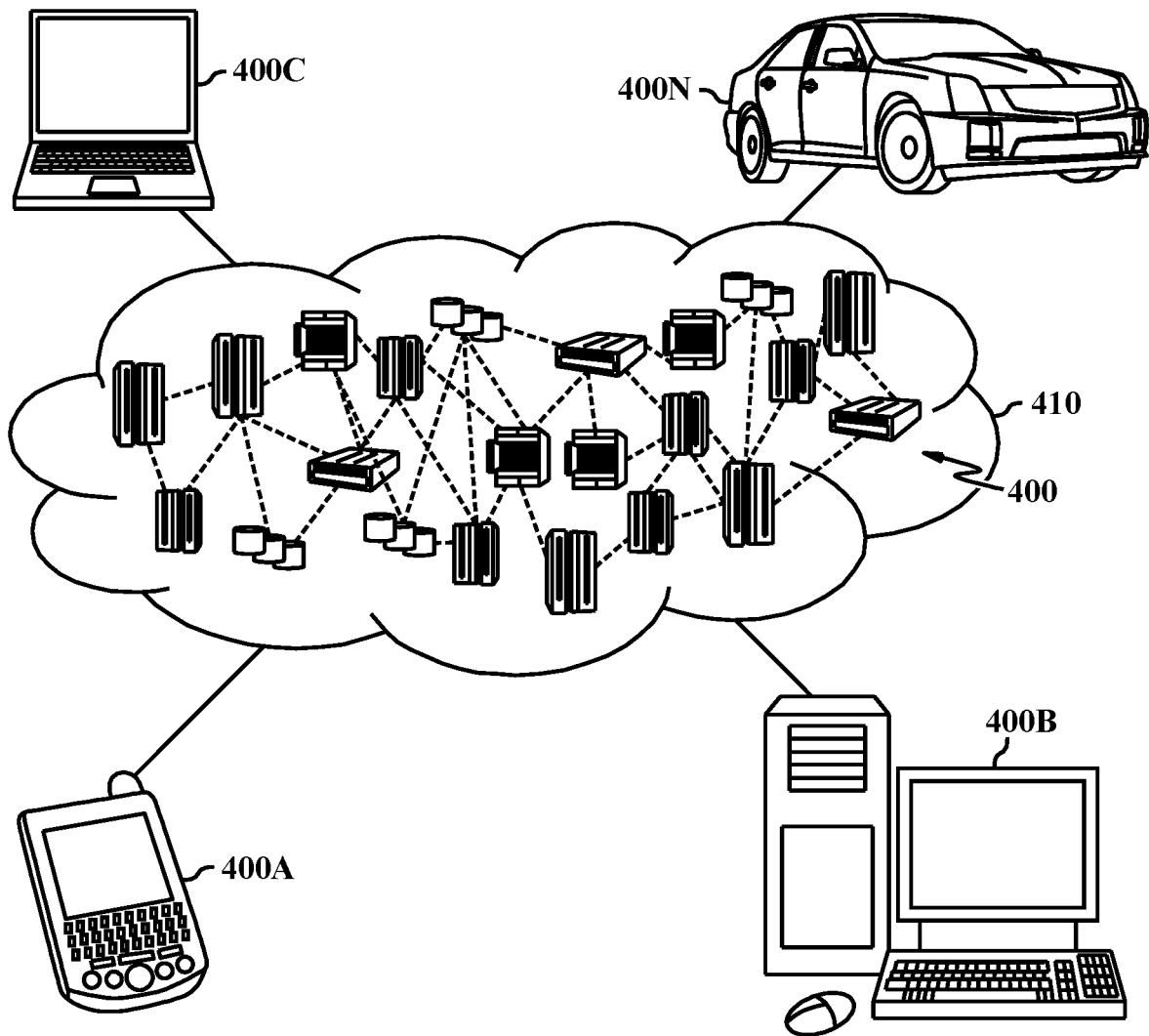
FIG. 4A illustrates a cloud computing environment, in accordance with embodiments of the present disclosure.

FIG. 4A, illustrated is a cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4A are intended to be illustrative only and that computing nodes 400 and cloud computing environment 410 can communicate with any type of computerized device over any type of network and/or network addressable connection (e.g., using a web browser).

Figure 4B:
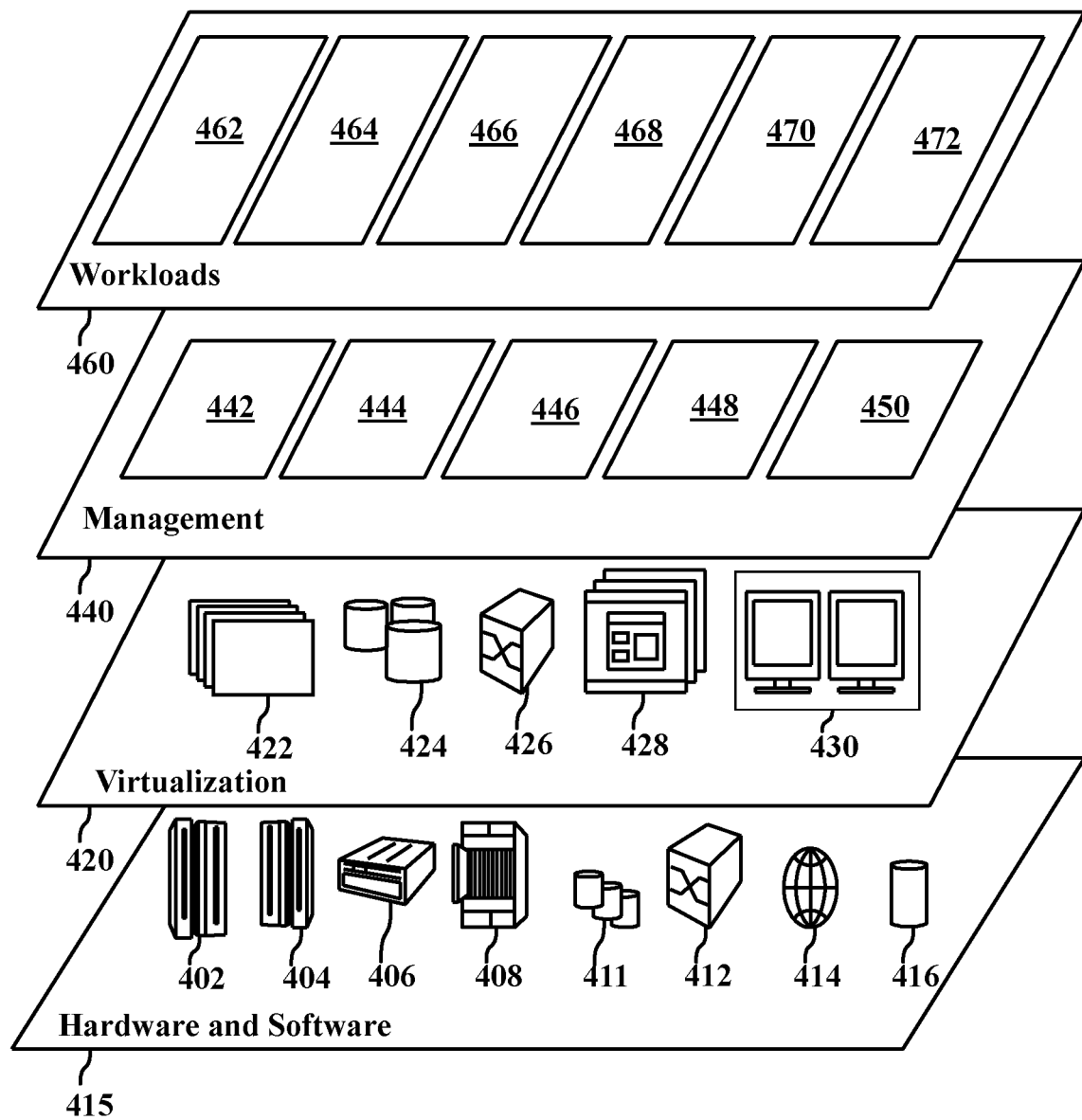
FIG. 4B illustrates abstraction model layers, in accordance with embodiments of the present disclosure.

FIG. 4B, illustrated is a set of functional abstraction layers provided by cloud computing environment 410 (FIG. 4A) is shown. It should be understood in advance that the components, layers, and functions shown in FIG. 4B are intended to be illustrative only and embodiments of the disclosure are not limited thereto. As depicted below, the following layers and corresponding functions are provided.

Hardware and software layer 415 includes hardware and software components. Examples of hardware components include: mainframes 402; RISC (Reduced Instruction Set Computer) architecture based servers 404; servers 406; blade servers 408; storage devices 411; and networks and networking components 412. In some embodiments, software components include network application server software 414 and database software 416.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430.

In one example, management layer 440 may provide the functions described below. Resource provisioning 442 provides dynamic procurement of computing resources and other resources that are utilized to perform tasks within the cloud computing environment. Metering and Pricing 444 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 446 provides access to the cloud computing environment for consumers and system administrators. Service level management 448 provides cloud computing resource allocation and management such that required service levels are met. Service Level Agreement (SLA) planning and fulfillment 450 provide pre-arrangement for, and procurement of, cloud computing resources for which a future requirement is anticipated in accordance with an SLA.

Workloads layer 460 provides examples of functionality for which the cloud computing environment may be utilized. Examples of workloads and functions which may be provided from this layer include: mapping and navigation 462; software development and lifecycle management 464; virtual classroom education delivery 466; data analytics processing 468; transaction processing 470; and reducing transaction aborts 472.

Figure 5:
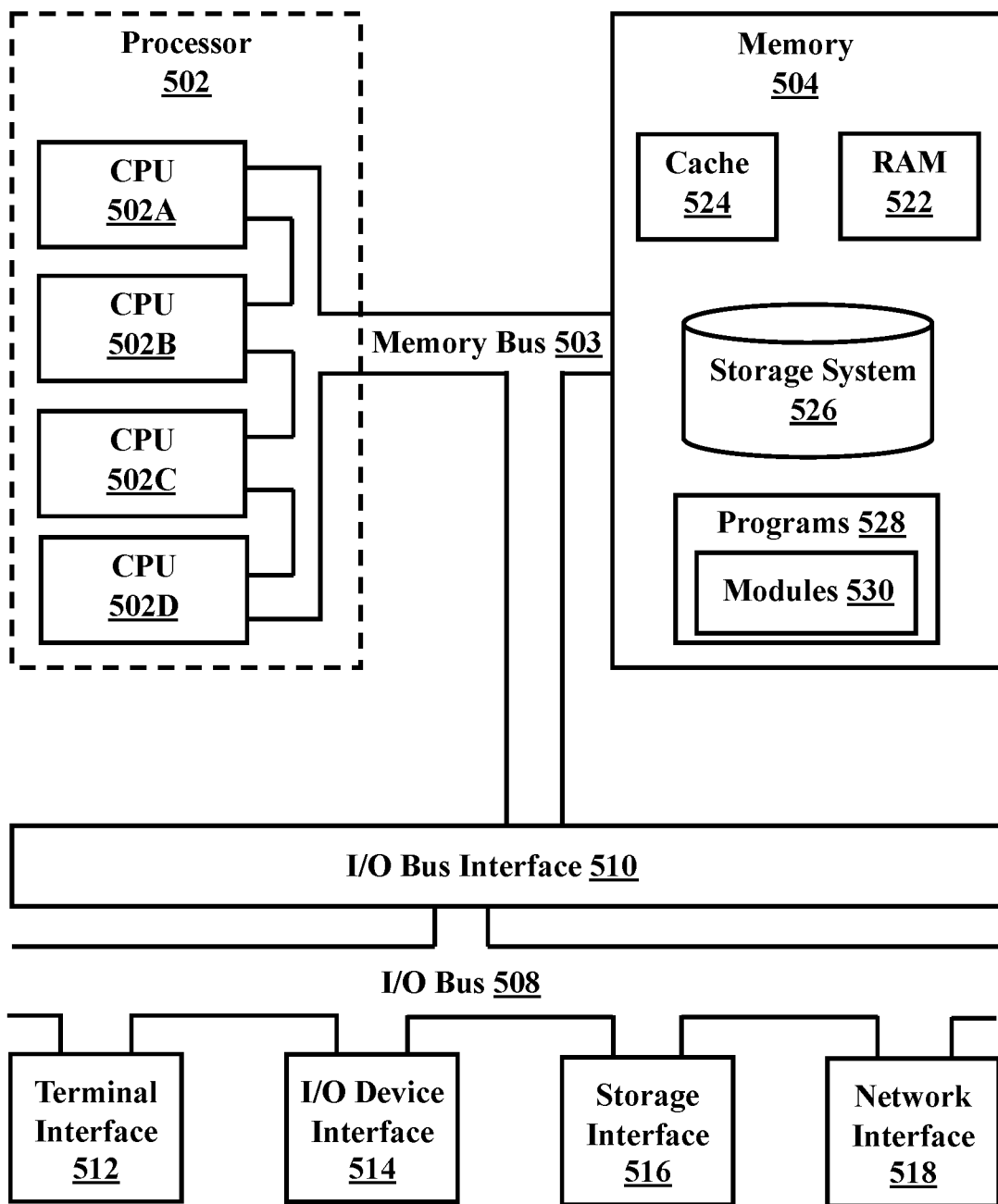
FIG. 5 illustrates a high-level block diagram of an example computer system that may be used in implementing one or more of the methods, tools, and modules, and any related functions, described herein, in accordance with embodiments of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for intercomponent communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for reducing transaction aborts in execute-order-validate blockchain models, the system comprising:
   a memory; and
   a processor in communication with the memory, the processor being configured to perform operations comprising:
   executing, by a first peer, an initial transaction related to a smart contract;
   storing a write set of the initial transaction in a first cache instance in a first peer node file system, wherein the first cache instance includes state information for proposed transactions simulated by the first peer, and wherein the first cache instance is uncommitted to a blockchain, the first cache instance being maintained by a cache update disseminator as the first cache instance of an uncommitted state cache shared among endorsers of the smart contract, including the first peer and a second peer;
   identifying a subsequent transaction, wherein the subsequent transaction reads from a cache of a corresponding peer node when a requested key of the subsequent transaction is present in the uncommitted state cache;
   executing, by the second peer, the subsequent transaction;
   storing a write set of the subsequent transaction in a second cache instance in a second peer node file system, wherein the second cache instance includes state information for proposed transactions simulated by the second peer, and wherein the second cache instance is uncommitted to a blockchain, the second cache instance being maintained by the cache update disseminator as the second cache instance of the uncommitted state cache;

disseminating, by the cache update disseminator, updates to the uncommitted state cache to the first cache instance and the second cache instance; and ordering the initial transaction and the subsequent transaction based on what is read from the uncommitted state cache, wherein ordering the initial transaction and the subsequent transaction avoids an abort of the subsequent transaction.

2. The system of claim 1, wherein ordering the initial transaction and the subsequent transaction includes validating the subsequent transaction by:

identifying a first version number used in the state information associated with the initial transaction;

identifying a second version number used in the state information associated with the subsequent transaction; and determining which of the first version number or the second version number is a dependent version number.

3. A method for reducing transaction aborts in execute-order-validate blockchain models, the method comprising:

executing, by a first peer, an initial transaction related to a smart contract;

storing a write set of the initial transaction in a first cache instance in a first peer node file system, wherein the first cache instance includes state information for proposed transactions simulated by the first peer, and wherein the first cache instance is uncommitted to a blockchain, the first cache instance being maintained by a cache update disseminator as the first cache instance of an uncommitted state cache shared among endorsers of the smart contract, including the first peer and a second peer;

identifying a subsequent transaction, wherein the subsequent transaction reads from a cache of a corresponding peer node when a requested key of the subsequent transaction is present in the uncommitted state cache;

executing, by the second peer, the subsequent transaction;

storing a write set of the subsequent transaction in a second cache instance in a second peer node file system, wherein the second cache instance includes state information for proposed transactions simulated by the second peer, and wherein the second cache instance is uncommitted to a blockchain, the second cache instance being maintained by the cache update disseminator as the second cache instance of the uncommitted state cache;

disseminating, by the cache update disseminator, updates to the uncommitted state cache to the first cache instance and the second cache instance; and ordering the initial transaction and the subsequent transaction based on what is read from the uncommitted state cache, wherein ordering the initial transaction and the subsequent transaction avoids an abort of the subsequent transaction.

4. The method of claim 3, wherein ordering the initial transaction and the subsequent transaction includes validating the subsequent transaction by:

identifying a first version number used in the state information associated with the initial transaction;

identifying a second version number used in the state information associated with the subsequent transaction; and determining which of the first version number or the second version number is a dependent version number.

5. A computer program product for reducing transaction aborts in execute-order-validate blockchain models, the computer program product comprising:

a computer readable storage medium having program instructions embodied therewith, the program instructions executable by a processor to cause the processor to perform a process comprising:

executing, by a first peer, an initial transaction related to a smart contract;

storing a write set of the initial transaction in a first cache instance in a first peer node file system, wherein the first cache instance includes state information for proposed transactions simulated by the first peer, and wherein the first cache instance is uncommitted to a blockchain, the first cache instance being maintained by a cache update disseminator as the first cache instance of an uncommitted state cache shared among endorsers of the smart contract, including the first peer and a second peer;

identifying a subsequent transaction, wherein the subsequent transaction reads from a cache of a corresponding peer node when a requested key of the subsequent transaction is present in the uncommitted state cache;

executing, by the second peer, the subsequent transaction;

storing a write set of the subsequent transaction in a second cache instance in a second peer node file system, wherein the second cache instance includes state information for proposed transactions simulated by the second peer, and wherein the second cache instance is uncommitted to a blockchain, the second cache instance being maintained by the cache update disseminator as the second cache instance of the uncommitted state cache;

disseminating, by the cache update disseminator, updates to the uncommitted state cache to the first cache instance and the second cache instance; and ordering the initial transaction and the subsequent transaction based on what is read from the uncommitted state cache, wherein ordering the initial transaction and the subsequent transaction avoids an abort of the subsequent transaction.

6. The computer program product of claim 5, wherein ordering the initial transaction and the subsequent transaction includes validating the subsequent transaction by:

identifying a first version number used in the state information associated with the initial transaction;

identifying a second version number used in the state information associated with the subsequent transaction; and determining which of the first version number or the second version number is a dependent version number.

* * * * *